(12) United States Patent
Feng (10) Patent No.: US 10,839,145 B2
(45) Date of Patent: Nov. 17, 2020

(54) FORM FILLING METHOD AND RELATED TERMINAL

(71) Applicant: Alibaba Group Holding Limited, Grand Cayman (KY)

(72) Inventor: Jinggang Feng, Chengdu (CN)

(73) Assignee: Alibaba Group Holding Limited, Grand Cayman (KY)

( * ) Notice: Subject to any disclaimer, the term of this patent is extended or adjusted under 35 U.S.C. 154(b) by 62 days.

(21) Appl. No.: 14/826,055

(22) Filed: Aug. 13, 2015

(65) Prior Publication Data

US 2016/0048494 A1 Feb. 18, 2016

(30) Foreign Application Priority Data

Aug. 14, 2014 (CN) .......................... 2014 1 0400299

(51) Int. Cl.
*G06F 3/00* (2006.01)
*G06F 40/174* (2020.01)

(52) U.S. Cl.
CPC ................................. *G06F 40/174* (2020.01)

(58) Field of Classification Search
CPC ............................. G06F 17/243; G06F 40/174
See application file for complete search history.

(56) References Cited

U.S. PATENT DOCUMENTS

2003/0058277 A1* 3/2003 Bowman-Amuah ........................
G06F 16/289
715/765
2011/0153728 A1* 6/2011 Einarsson ......... H04W 52/0229
709/203

(Continued)

FOREIGN PATENT DOCUMENTS

CN 103310329 9/2013
CN 103455338 12/2013
(Continued)

OTHER PUBLICATIONS

PCT Search Report and Written Opinion dated Oct. 28, 2015 for PCT Application No. PCT/US15/45130, 9 pages.

(Continued)

*Primary Examiner* — Kyle R Stork
(74) *Attorney, Agent, or Firm* — Lee & Hayes, P.C.

(57) ABSTRACT

A form filling method and related terminals are disclosed. The method includes scanning, by a first terminal, a digital object identifier generated by a second terminal; acquiring an operational source identifier of a form to be filled and item(s) to be filled from the digital object identifier; acquiring information content(s) corresponding to the item(s) to be filled from a pre-stored correspondence relationship between the information item(s) and the information content(s) and/or through an auxiliary device of the first terminal; and sending the information content(s) corresponding to the item(s) to be filled and the operational source identifier to a first server correspondingly, to enable the second terminal to acquire the information content(s) corresponding to the item(s) to be filled from the first server based on the operational source identifier to fill in the form. As can be seen, in the present disclosure, form information of the user does not need to be stored in the second terminal, thus improving the security. Furthermore, the second terminal may acquire the information content(s) corresponding to the item(s) to be filled regardless of how the item(s) may have been changed, thus being applicable to a number of different application scenarios.

20 Claims, 5 Drawing Sheets

(56) References Cited

U.S. PATENT DOCUMENTS

| | | | |
|---|---|---|---|
| 2011/0307318 A1 | 12/2011 | LaPorte et al. | |
| 2012/0063684 A1 | 3/2012 | Denoue et al. | |
| 2012/0089659 A1* | 4/2012 | Halevi | G06F 17/243 709/201 |
| 2012/0284602 A1 | 11/2012 | Seed et al. | |
| 2014/0089408 A1 | 3/2014 | Zhang | |
| 2014/0108456 A1 | 4/2014 | Ramachandrula et al. | |
| 2014/0173408 A1 | 6/2014 | Canaud et al. | |
| 2014/0201102 A1 | 7/2014 | Srinivasan et al. | |
| 2014/0258724 A1* | 9/2014 | Lambert | H04L 63/062 713/170 |
| 2014/0304297 A1* | 10/2014 | Lian | G06F 21/10 707/769 |
| 2015/0006672 A1* | 1/2015 | Morel | H04L 67/306 709/217 |
| 2015/0019949 A1* | 1/2015 | Breard | G06F 17/2288 715/229 |
| 2015/0127714 A1* | 5/2015 | Ivashyn | H04W 12/0608 709/203 |
| 2015/0205777 A1 | 7/2015 | Campanelli et al. | |
| 2015/0248391 A1 | 9/2015 | Watanabe | |
| 2016/0364407 A1* | 12/2016 | Hong | G06F 16/182 |

FOREIGN PATENT DOCUMENTS

| | | |
|---|---|---|
| CN | 103544136 | 1/2014 |
| CN | 103531810 | 3/2014 |
| JP | 2002324199 | 11/2002 |
| JP | 2004259191 | 9/2004 |
| JP | 2013041427 | 2/2013 |
| KR | 20120005392 A | 1/2012 |
| KR | 20120100674 A | 9/2012 |
| KR | 20140059635 A | 5/2014 |
| KR | 101578172 B1 | 12/2015 |
| WO | WO2004003768 | 1/2004 |
| WO | WO 2013/068719 * | 5/2013 |
| WO | WO2013068719 | 5/2013 |

OTHER PUBLICATIONS

The Extended European Search Report dated Feb. 27, 2018 for European Patent Application No. 15831676.0, 6 pages.

Chinese Office Action for Application No. 201410400299.X. dated Dec. 1, 2017, Fang, "Form Filling Method and Related Terminals", 7 pages.

Chinese Office Action for Application No. 201410400299.X, dated Jul. 24, 2018, Feng, "Form Filling Method and Related Terminals", 10 pages.

The Chinese Search Report dated Nov. 17, 2017 for Chinese Patent Application No. 201410400299.X, 2 pages.

The Korean Office Action dated Jul. 10, 2019 for Korean Patent Application No. 2017-7003434, a counterpart of U.S. Appl. No. 14/826,055, 9 pages.

The Korean Office Action dated Nov. 18, 2019 for Korean Patent Application No. 2017-7003434, a counterpart of U.S. Appl. No. 14/826,055, 6 pages.

* cited by examiner

FIG. 1

A SECOND TERMINAL GENERATES A DIGITAL OBJECT IDENTIFIER. THE DIGITAL OBJECT IDENTIFIER INCLUDES AN OPERATIONAL SOURCE IDENTIFIER OF A FORM TO BE FILED AND ITEM(S) TO BE ENTERED BY A USER ON THE SECOND TERMINAL, TO ENABLE A FIRST TERMINAL TO SCAN THE DIGITAL OBJECT IDENTIFIER, OBTAIN INFORMATION CONTENT(S) CORRESPONDING TO THE ITEM(S) TO BEENTERED FROM A PRE-STORED CORRESPONDENCE RELATIONSHIP BETWEEN THE INFORMATION ITEM(S) AND THE INFORMATION CONTENT(S) AND/OR THROUGH AN AUXILIARY DEVICE OF THE FIRST TERMINAL, AND SEND THE INFORMATION CONTENT(S) CORRESPONDING TO THE ITEM(S) TO BE ENTERED AND THE OPERATIONAL SOURCE IDENTIFIER TO A FIRST SERVER CORRESPONDINGLY — S201

THE SECOND TERMINAL ACQUIRES THE INFORMATION CONTENT(S) CORRESPONDING TO THE ITEM(S) TO BE ENTERED FROM THE FIRST SERVER BASED ON THE OPERATIONAL SOURCE IDENTIFIER TO PERFORM A FILLING-IN OF THE FORM — S202

FORM FILLING METHOD AND RELATED TERMINAL

CROSS REFERENCE TO RELATED PATENT APPLICATION

This application claims foreign priority to Chinese Patent Application No. 201410400299.X filed on Aug. 14, 2014, entitled "Form Filling Method and Related Terminal", which is hereby incorporated by reference in its entirety.

TECHNICAL FIELD

The present disclosure relates to the field of information processing, and more particularly, to form filling methods and related terminals.

BACKGROUND

In a number of application scenarios, a user is required to fill in a form for ordering a corresponding service to be provided. For example, when an authentication service, such as registration or login, is provided to a user, the user is required to enter identity information into a form. When a related life service is provided to a user, the user is required to enter address information of the user into a form.

A conventional approach of form filling is to enter information into a form manually by a user. However, this approach not only results in a complex user operation, but also is error-prone. Therefore, a number of existing websites or applications provide a function of storing form information automatically. For example, when a user performs identity verification for the first time, identity information entered by the user is stored. The next time the user performs the identity verification, a form is filled according to the stored identity information to implement an automatic verification.

For this approach of storing form information automatically, form information needs to be stored in a terminal that eventually provides a corresponding service, thus leading to low security, especially being almost unusable in a public terminal. Moreover, this approach has a low versatility and is not applicable to a number of different application scenarios. For example, when a user logs into a certain website or application for the first time or uses a certain terminal to fill in a form for the first time, the form cannot be filled using such an approach.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

A technical problem to be solved by the present disclosure is to provide a form filling method and a related terminal to implement an automatic form filling under different scenarios and to improve versatility and security.

Accordingly, technical solutions of the present disclosure for solving the technical problem are given as follows.

In an embodiment of the present disclosure, a form filling method is provided, which includes a first terminal scanning a digital object identifier generated by a second terminal, the digital object identifier including an operational source identifier of a form to be filled and an item to be filled in the second terminal by a user; the first terminal obtaining the operational source identifier and the item to be filled from the digital object identifier; the first terminal obtaining information content corresponding to the item to be filled from a pre-stored correspondence relationship between an information item and the information content and/or through an auxiliary device of the first terminal; and the first terminal sending the information content corresponding to the item to be filled and the operational source identifier to a first server to enable the second terminal to obtain the information content corresponding to the item to be filled from the first server based on the operational source identifier to fill in the form.

Optionally, the first server is a designated server configured to fill form information.

Optionally, the digital object identifier further includes an information attribute of the item to be filled. The method may further include the first terminal obtaining the information attribute from the digital object identifier; and the first terminal determining whether the information content corresponding to the item to be filled matches with the information attribute, performing an automatic format adjustment or prompting the user to make an manual modification if not, and sending the information content corresponding to the item to be filled and the operational source identifier to the first server until a match is obtained.

Optionally, the method may further include the first terminal modifying the information content corresponding to the item to be filled according to an instruction of the user before sending the information content corresponding to the item to be filled to the first server.

Optionally, the auxiliary device includes one or more of a Global Positioning System (GPS) device, a subscriber identity module (SIM) card, a recorder, a gyroscope and a camera.

Optionally, the operational source identifier is used for identifying the form to be filled, and the form to be filled is a form to which the item to be filled belongs.

An embodiment of the present disclosure further provides a form filling method, which includes:

a second terminal generating a digital object identifier, the digital object identifier including an operational source identifier of a form to be filled and an item to be filled by a user on the second terminal to enable a first terminal to scan the digital object identifier, obtain information content corresponding to the item to be filled from a pre-stored correspondence relationship between an information item and the information content and/or through an auxiliary device of the first terminal, and send the information content corresponding to the item to be filled and the operational source identifier to a first server; and the second terminal obtaining the information content corresponding to the item to be filled from the first server based on the operational source identifier to fill in the form.

Optionally, the first server is a designated server provided for filling form information.

Optionally, the second terminal obtaining the information content corresponding to the item to be filled from the first server based on the operational source identifier may include the second terminal recursively performing the obtaining of the information content corresponding to the item to be filled from the first server based on the operational source identifier until the information content corresponding to the item to be filed is obtained.

Optionally, the method may further include the second terminal submitting the information content corresponding to the item to be filed to a second server to perform a subsequent operation after filling in the form.

Optionally, the method may further include the second terminal modifying the information content corresponding to the item to be filed according to an instruction of the user prior to submitting the information content corresponding to the item to be filed to the second server.

Optionally, the operational source identifier is used for identifying the form to be filed, and the form to be filed is a form to which the item to be filed belongs.

An embodiment of the present disclosure further provides a form filling terminal, the terminal being a first terminal. The first terminal includes a first acquisition unit to obtain from a scanned digital object identifier, an operational source identifier of a form to be filed and an item to be filed by a user on a second terminal, the digital object identifier being a digital object identifier generated by the second terminal; a second acquisition unit to obtain information content corresponding to the item to be filed from a pre-stored correspondence relationship between an information item and the information content and/or through an auxiliary device of the first terminal; and a sending unit to send the information content corresponding to the item to be filed and the operational source identifier to a first server to enable the second terminal to obtain the information content corresponding to the item to be filed from the first server based on the operational source identifier to fill in the form.

Optionally, the first server is a dedicated server provided for filling form information.

Optionally, the digital object identifier may further include an information attribute of the item to be filed.

In an embodiment, the first acquisition unit may further obtain the information attribute from the digital object identifier.

In an embodiment, the first terminal may further include a matching unit to determine whether the information content corresponding to the item to be filed matches with the information attribute, perform an automatic format adjustment or prompt the user to make an manual modification if not, and notify the sending unit to send the information content corresponding to the item to be filed and the operational source identifier to the first server upon a successful matching.

Optionally, the first terminal may further include a first modification unit to modify the information content corresponding to the item to be filed according to an instruction of the user before the sending unit sends the information content corresponding to the item to be filed to the first server.

Optionally, the auxiliary device may include one or more of a GPS device, a SIM card, a recorder, a gyroscope, and a camera.

Optionally, the operational source identifier is used for identifying the form to be filed, and the form to be filed is a form to which the item to be filed belongs.

An embodiment of the present disclosure further provides a form filling terminal, the terminal being a second terminal. The second terminal includes a generation unit to generate a digital object identifier, the digital object identifier including an operational source identifier of a form to be filled and an item to be filled by a user on the second terminal to enable a first terminal to scan the digital object identifier, obtain information content corresponding to the item to be filled from a pre-stored correspondence relationship between an information item and the information content and/or through an auxiliary device of the first terminal, and send the information content corresponding to the item to be filled and the operational source identifier to a first server; and a filling unit to obtain the information content corresponding to the item to be filled from the first server based on the operational source identifier to fill in the form.

Optionally, the first server is a dedicated server provided for filling form information.

Optionally, the filling unit recursively performs the obtaining of the information content corresponding to the item to be filled from the first server based on the operational source identifier until the information content corresponding to the item to be filled is obtained.

Optionally, the second terminal may further include a submission unit to submit the information content corresponding to the item to be filled to a second server to perform a subsequent operation after the filling unit fills in the form.

Optionally, the second terminal may further include a second modification unit to modify the information content corresponding to the item to be filled according to an instruction of the user before the submission unit submits the information content corresponding to the item to be filled to the second server.

Optionally, the operational source identifier is used for identifying the form to be filled, and the form to be filled is a form to which the item to be filled belongs.

As can be seen from the foregoing technical solutions, when a user wants to fill in a form on a second terminal in the embodiments of the present disclosure, the second terminal generates a digital object identifier that includes an operational source identifier of the form to be filled and an item to be filled by the user via the second terminal. A first terminal only needs to scan the digital object identifier to obtain information included therein, acquires information content corresponding to the item to be filled from a pre-stored correspondence relationship between an information item and the information contents and/or through an auxiliary device, and sends the information content corresponding to the item to be filled and the operational source identifier to the first server, to enable the second terminal to obtain the information content corresponding to the item to be filled from the first server based on the operational source identifier to complete the filling of the form. As can be seen, in the embodiment of the present disclosure, information of the form of the user does not need to be stored in the second terminal, thus improving the security, and is not affected even if the second terminal is a public terminal. Furthermore, in the embodiments of the present disclosure, the second terminal may obtain information content corresponding to an item to be filled based on a stored correspondence relationship or through an auxiliary device no matter how the item to be filled has changed, thus being applicable to a number of different application scenarios. For example, completing form information can be automatically performed even if a user logs into a certain website or application for the first time or use a second terminal for the first time.

DETAILED DESCRIPTION

Under a number of application scenarios, a user is needed to enter information into a form in order for a corresponding service to be provided. For example, when a registration or identity authentication service is provided to a user, the user needs to enter identity information into a form. When a related life service is provided to a user (for example, information is provided relating to the weather or surrounding shop information at an address where the user lives), the user needs to enter user address information into a form.

A relatively conventional form filling approach is to fill in a form manually by users. However, such approach not only leads to a relatively complicated user operation, but is also error-prone. Therefore, at present, a number of websites or applications recently provide a function of storing form information automatically. For example, when a user performs an identity authentication for the first time, identity information completed by the user is stored. The next time the user performs the identity authentication, form information is filled in based on the stored identity information, thus implementing an automatic authentication.

For such methods of automatic storage of form information, form information needs to be stored on a terminal that eventually provides a corresponding service. For example, when a user uses a terminal A to perform identity authentication, identity information is stored in the terminal A accordingly. Other users may easily discover the identity information of the user used in identity authentication when using the terminal A, thus resulting in low security, and being almost unusable in a public terminal in particular. Moreover, this type of approach has a low versatility, and is not applicable to a number of different application scenarios. For example, when a user performs identity authentication for the first time or uses a certain terminal to complete a form for the first time, the terminal does not have a storage of form information of the user, and therefore form filling cannot be achieved via this type of approach.

In addition to the approach of automatic storage of form information, another form filling approach that stores form information of users in a server exists. However, since the server stores the form information of multiple users, each user still needs to input identification information of the respective user manually during operation, thus failing to implement a completely automatic filling. Moreover, this approach needs to store a large amount of data in the server, which places a burden on the server.

The embodiments of the present disclosure provide a form filling method and a related terminal to implement an automatic filling of a form under different scenarios, thus improving versatility and security.

The technical solutions in the embodiments of the present disclosure will be clearly and comprehensively described herein with reference to the accompanying drawings in the embodiments of the present disclosure. Apparently, the described embodiments merely represent a part but not all of the embodiments of the present disclosure. All other embodiments obtained by one skilled in the art based on the embodiments in the present disclosure without making any creative effort fall within the scope of protection of the present disclosure.

Figure 1:
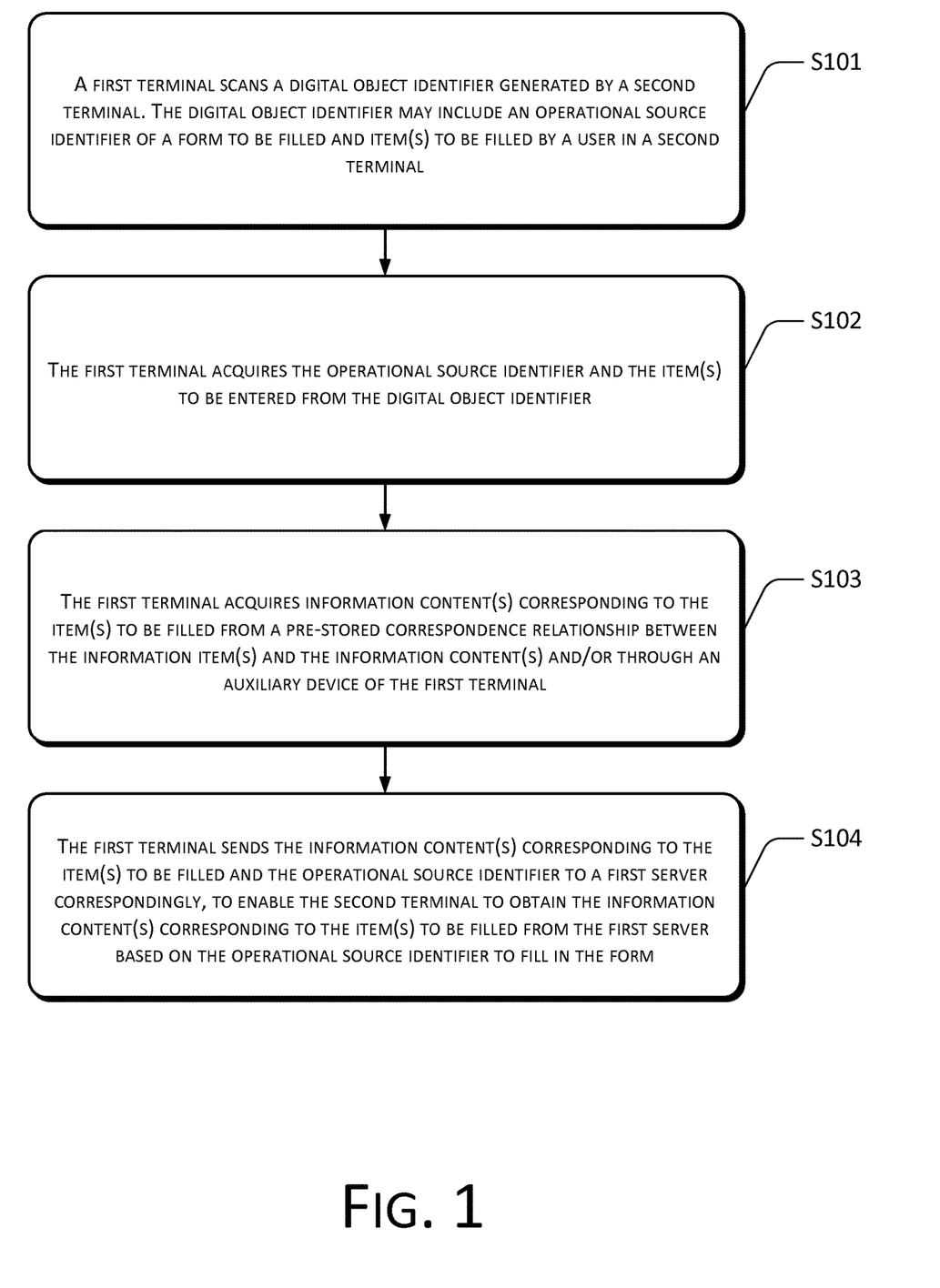
FIG. 1 is a flowchart of an example method according to embodiments of the present disclosure.

Referring to FIG. 1, the embodiments of the present disclosure provide an example form filling method. In this example method, an executing entity is a first terminal.

The example method may include:

At S101, a first terminal scans a digital object identifier generated by a second terminal. The digital object identifier may include an operational source identifier of a form to be filled and item(s) to be filled by a user in a second terminal.

When a user needs to fill in a form in a second terminal, the second terminal generates a digital object identifier to be scanned by a first terminal. The first terminal corresponds to a single user only, thus having a high degree of privacy. For example, the first terminal may be a mobile terminal such as a mobile phone or an PAD, or may be a personal computer of the user. No limitation is imposed on the second terminal, which may generally be a public terminal.

The digital object identifier may be used for identifying digital information that includes Internet information, and may include, for example, a two-dimensional code, a bar code, etc. When scanning a digital object identifier, the first terminal may directly scan a digital object identifier that is displayed on a screen of the second terminal. In a scenario where the first terminal may not be moved easily, the second terminal may print out the digital object identifier, and the first terminal may then scan the printed digital object identifier.

The operational source identifier of the form to be filled by the user in the second terminal may identify the form that needs to be filled at this time, and the form to be filled refers to a form to which the item(s) to be entered belong(s). The operational source identifier may be generated based on the form, which in this case may allow multiple users to fill multiple forms at the same time. For example, multiple pages may be open at the same time in the second terminal, with each page corresponding to a form to be filled. A respective operational source identifier of a form to be filled on each page is generated based on a session identifier of the respective page, and therefore each operational source identifier corresponds to a particular form. The operational source identifier may also be a fixed identifier, which in this case may satisfy a requirement of a particular scenario (for example, after the digital object identifier is printed, the operational source identifier in the digital object identifier generally needs to be in a status of being available all the time). For example, the operational source identifier may include a terminal identifier (an Internet Protocol (IP) address, a media access control (MAC) address, etc.) of the second terminal, or may include a unique identifier that is randomly generated and satisfies a preset length.

The item(s) to be entered refer(s) to information item(s) that the user needs to enter into the form to be filled of the second terminal to acquire a certain service. For example, when the user wants to perform user registration through the second terminal, the user needs to enter information items such as a username, a birth date, an age, an address, a mobile phone number, and a headshot, etc., into a form of the second terminal.

At S102, the first terminal acquires the operational source identifier and the item(s) to be entered from the digital object identifier.

The first terminal may acquire information included in the digital object identifier by decoding the digital object identifier. A decoding method of the first terminal corresponds to an encoding method of the second terminal for generating the digital object identifier. For example, if the second terminal generates the digital object identifier according to a quick response (QR) encoding rule, the first terminal may perform decoding according to a QR decoding rule at this method block.

At S103, the first terminal acquires information content(s) corresponding to the item(s) to be filled from a pre-stored correspondence relationship between the information item(s) and the information content(s) and/or through an auxiliary device of the first terminal.

In an embodiment of the present disclosure, the first terminal acquires the information content(s) corresponding to the item(s) to be filled in at least two different approaches.

In a first acquisition approach, the first terminal pre-stores a correspondence relationship (as shown in Table 1, for example) between information item(s) and information content(s), and acquires the information content(s) corresponding to the item(s) to be filled from the stored correspondence relationship. Table 1 is used as an example. If items to be filled are name and age, corresponding information contents acquired from the stored correspondence relationship are "Zhang San" and "32" respectively.

TABLE 1

| Information item | Information content |
| --- | --- |
| Name | Zhang San |
| Birth date | 1982 Sep. 4 |
| Age | 32 |
| Address information | High-tech zone of Chengdu city |
| Mobile phone number | 138XXXXXXXX |
| Headshot | 219847.jpg |

In a second acquisition approach, the first terminal may obtain the information content(s) corresponding to the item(s) to be completed via an auxiliary device of the first terminal in real time. The auxiliary device may include at least one of a GPS device, a SIM card, a recorder, a gyroscope or a camera. Address information may be acquired through the GPS device. A mobile phone number may be acquired through the SIM card. Image information used as headshot information of the user may be acquired through the camera. Voice information, e.g., voice control command or identity recognition voice that is commonly used, may be recorded through the recorder. An operation habit of the user, such as a horizontal or vertical operation habit, etc., may be recorded through the gyroscope.

After obtaining the item(s) to be filled from the digital object identifier, whether the first acquisition approach or the second acquisition approach is used for a respective information content corresponding to each item to be filled may be determined according to a preset acquisition mode. Furthermore, a corresponding validity period, such as the one shown in Table 2, may be set for the respective information content corresponding to each information item. It should be noted that some information contents corresponding to some information items may also be computed and obtained based on respective information content(s) corresponding to other information item(s). For example, information content corresponding to an information item "Age" may be computed and obtained based on information content corresponding to an information item "Birth date".

TABLE 2

| Information item | Information content | Acquisition path | Validity period |
| --- | --- | --- | --- |
| Name | Zhang San | Pre-storage | Permanent |
| Birth date | 1982 Sep. 4 | Pre-storage | Permanent |
| Age | 32 | Computed based on birth date | 1 year |
| Address information | High-tech zone of Chengdu city | GPS positioning, map calculation | 0 |
| Mobile phone number | 138XXXXXXXX | Read from SIM card | 0 |
| Headshot | 219847.jpg | Shooting or pre-storage | 0 |

It should be noted that, by obtaining the information content(s) through the pre-stored correspondence relationship and/or the auxiliary device, the present disclosure is applicable in a number of different application scenarios via a terminal. For example, form filling is able to be performed through a first terminal in any scenario such as login, registration, identity authentication and life service acquisition, etc. Although item(s) filled in a form var(ies) each time, information content(s) may be selected from the pre-stored correspondence relationship and/or may be acquired through the auxiliary device to ensure filling-in of different forms.

At S104, the first terminal sends the information content(s) corresponding to the item(s) to be filled and the operational source identifier to a first server correspondingly, to enable the second terminal to obtain the information content(s) corresponding to the item(s) to be filled from the first server based on the operational source identifier to fill in the form.

It should be noted that the second terminal may, in an embodiment of the present disclosure, actively acquire the corresponding information content(s) from the first server. After the first terminal sends the corresponding information content(s) and the operational source identifier to the first server, the first server may store thereof temporarily. After generating the digital object identifier, the second terminal may cyclically attempt to acquire whether the first server stores the foregoing information, until the foregoing information stored in the first server is acquired. After the second terminal acquires the information, the first server may delete the information to avoid an information leakage.

In an embodiment of the present disclosure, the second terminal finally acquires the information content(s) corresponding to the item(s) to be filled to fill in the form, and may send to a second server to perform subsequent operations. It is noted herein that the subsequent operations mentioned in the embodiment of the present disclosure mainly include an authentication operation such as identity authentication, login, registration, etc., and a service acquisition operation (for example, acquiring a life service based on address information).

As can be seen from the foregoing technical solutions, in the embodiments of the present disclosure, when a user wants to fill in a form in a second terminal, the second terminal generates a digital object identifier including an operational source identifier of a form to be filled and item(s) to be filled by the user in the second terminal. A first terminal only needs to scan the digital object identifier to acquire information included therein, and acquires information content(s) corresponding to the item(s) to be filled from a pre-stored correspondence relationship between the information item(s) and the information content(s) and/or through an auxiliary device, and sends the information content(s) corresponding to the item(s) to be filled and the operational source identifier to a first server correspondingly, to allow the second terminal to obtain the information content(s) corresponding to the item(s) to be filled from the first server based on the operational source identifier to fill in the form. As can be seen from the embodiments of the present disclosure, form information of the user does not need to be stored in the second terminal, but is stored in the first terminal having a certain degree of privacy, thus improving security and being not affected even if the second terminal is a public terminal. Furthermore, in the embodiments of the present disclosure, the second terminal may actively acquire information content(s) corresponding to item(s) to be filled based on a stored correspondence relationship or through an auxiliary device regardless of how the item(s) to be filled change(s), thus being applicable to a number of different application scenarios. For example, form information is able to be filled automatically using the foregoing embodiments even if a user logs into a certain website or application for the first time or use a second terminal for the first time.

The embodiments of the present disclosure also have the following advantages.

1. In the embodiments of the present disclosure, the first terminal only stores unique user information content and does not need to perform user selection, thus achieving a completely automatic filling. Furthermore, storage of form information of all users in a server is not needed, thus alleviating the burden of the server.

2. The embodiments of the present disclosure are applicable in various different scenarios such as identity authentication, registration, login, user identification and life service, etc., via a terminal. Furthermore, due to the versatility of a digital object identifier, cross-platform, multi-purpose and multi-scenario form filling can be implemented conveniently.

The digital object identifier technology is often used for transmitting information. Therefore, under a normal situation, a scanning party obtains information provided by a scanned party. However, the embodiments of the present disclosure takes an opposite approach and breaks away from the conventional concept that the scanned party obtains information from the scanning party, thus achieving the scanned party to fill a form automatically.

The first server in the embodiments of the present disclosure may not be used for performing subsequent operations related to authentication and service acquisition, and may be a dedicated server set up for form filling. In other words, all first terminals send information as described above to the first server, and the first server provides thereof to a second terminal to perform form filling, which has higher privacy and security. Furthermore, the dedicated server may provide an automatic filling service to the second terminal in combination with an application of the first terminal, and the development of a set of terminal applications and filling servers for the second terminal is not needed. The first terminal may also send the corresponding item(s) to be filled when sending the information content(s) to the first server, so that the second terminal is able to fill the information content(s) corresponding to the item(s) to be filled into the form correctly. Alternatively, the first terminal may also send the information content(s) to the first server according to a filling rule that has been agreed upon with the second terminal in advance. For example, the first terminal and the second terminal agree in advance that corresponding information contents are sent in order of the items to be filled.

When filling a form, each information item generally has a certain restriction, for example, format restrictions such as a character type, a length, etc., or whether the item is mandatory, the second terminal may further enable the generated digital object identifier to include respective information attribute(s) of the item(s) to be filled. An information attribute indicates a restriction on a respective information item. In an embodiment, the example method may further include the first terminal obtaining respective information attribute(s) of the item(s) to be filled from the digital object identifier, the first terminal determining whether the information content(s) corresponding to the item(s) to be filled match(es) with the respective information attribute(s) of the item(s) to be filled, performing an automatic format adjustment or prompting the user to make an manual modification if not, and performing the method block of sending to the first server at S104 until the information content(s) match(es) with the respective information attribute(s). When determining whether the information content(s) match(es) with the respective information attribute(s), the respective information attribute(s) may be resolved as Boolean expression(s), and the information content(s) is put in the Boolean expression for computation. If a computation result is negative, this indicates a mismatch.

In an embodiment of the present disclosure, before sending the information content(s) to the first server, the first terminal may display the information content(s) therein in advance. The user may check whether the information content(s) to be sent is/are erroneous or missing. If erroneous or missing information content(s) exist(s), the information content(s) corresponding to the item(s) to be filled is/are modified according to an instruction of the user, and the modified content is sent to the first server.

In the foregoing embodiments, the form filling method provided by the embodiments of the present disclosure is introduced from the perspective of the first terminal. Embodiments of the present disclosure from the perspective of the second terminal are described hereinafter.

Figure 2:
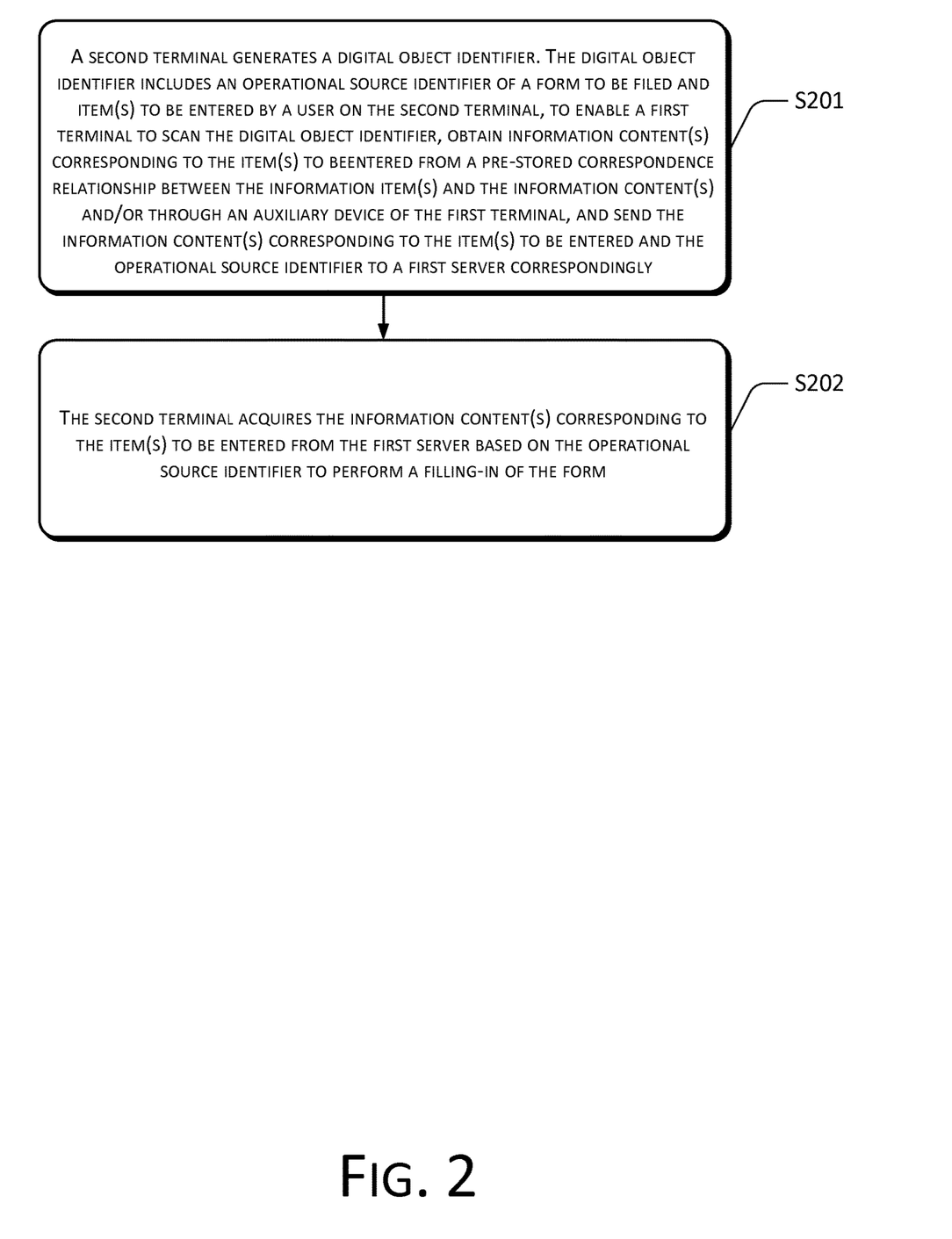
FIG. 2 is a flowchart of another example method according to the embodiments of the present disclosure.

Referring to FIG. 2, the embodiments of the present disclosure provide another embodiment of a form filling method. An executing entity is a second terminal.

In an embodiment, the example method may include:

At S201, a second terminal generates a digital object identifier. The digital object identifier includes an operational source identifier of a form to be filled and item(s) to be entered by a user on the second terminal, to enable a first terminal to scan the digital object identifier, obtain information content(s) corresponding to the item(s) to be entered from a pre-stored correspondence relationship between the information item(s) and the information content(s) and/or through an auxiliary device of the first terminal, and send the information content(s) corresponding to the item(s) to be entered and the operational source identifier to a first server correspondingly.

When a user needs to fill in a form on the second terminal, the second terminal generates a digital object identifier that is to be scanned by the first terminal. The digital object identifier may be displayed in a display screen of the second terminal and scanned by the first terminal. Alternatively, the digital object identifier may be printed out by the second terminal and the printed digital object identifier is scanned by the first terminal.

The operational source identifier of the form to be filled by the user on the second terminal may identify a form to be filled at this time. The form to be filled refers to a form to which the item(s) to be filled belong(s). The operational source identifier may be generated based on the form, which in this case can enable multiple users to fill multiple forms at the same time. The operational source identifier may alternatively be a fixed identifier, which in this case can satisfy a requirement of a particular scenario (for example, after the digital object identifier is printed, the operational source identifier in the digital object identifier generally needs to be available all the time).

An item to be filled refers to an information item that a user needs to fill in a form to be filled of the second terminal to acquire certain services. For example, when a user wants to perform user registration through the second terminal, the user needs to fill information items such as a username, a birth date, an age, an address, a mobile phone number, a headshot, etc., into a form of the second terminal.

At S202, the second terminal acquires the information content(s) corresponding to the item(s) to be entered from the first server based on the operational source identifier to perform a filling-in of the form.

Obtaining the information content(s) corresponding to the item(s) to be filled from the first server by the second terminal based on the operational source identifier refers to cyclically performing an attempt of obtaining the information content(s) corresponding to the item(s) to be filled from the first server by the second terminal based on the operational source identifier until the information content(s) corresponding to the item(s) to be filled is/are obtained.

In an embodiment of the present disclosure, the second terminal finally obtains the information content(s) corresponding to the item(s) to be filled to complete the filling of the form, and may then submit the information content(s) corresponding to the item(s) to be filled to a second server, to allow the second server to perform subsequent operations such as an authentication operation or service acquisition, etc.

Before the second terminal submits the information content(s) corresponding to the item(s) to be filled to the second server, the information content may also be displayed on the second terminal. The user may check whether the filled information content(s) is/are erroneous or missing. If so, the information content(s) corresponding to the item(s) to be filled may be modified according to an instruction of the user, and the modified information content(s) may be submitted to the second server.

In an embodiment, the first server may be a dedicated server set up for filling form information.

This example method corresponds to the method embodiment shown in FIG. 1, and is therefore described in a relatively simple manner. Reference may be made to relevant portions of the embodiment shown in FIG. 1.

A specific application scenario of the embodiments of the present disclosure is described hereinafter using an example implementation.

Figure 3:
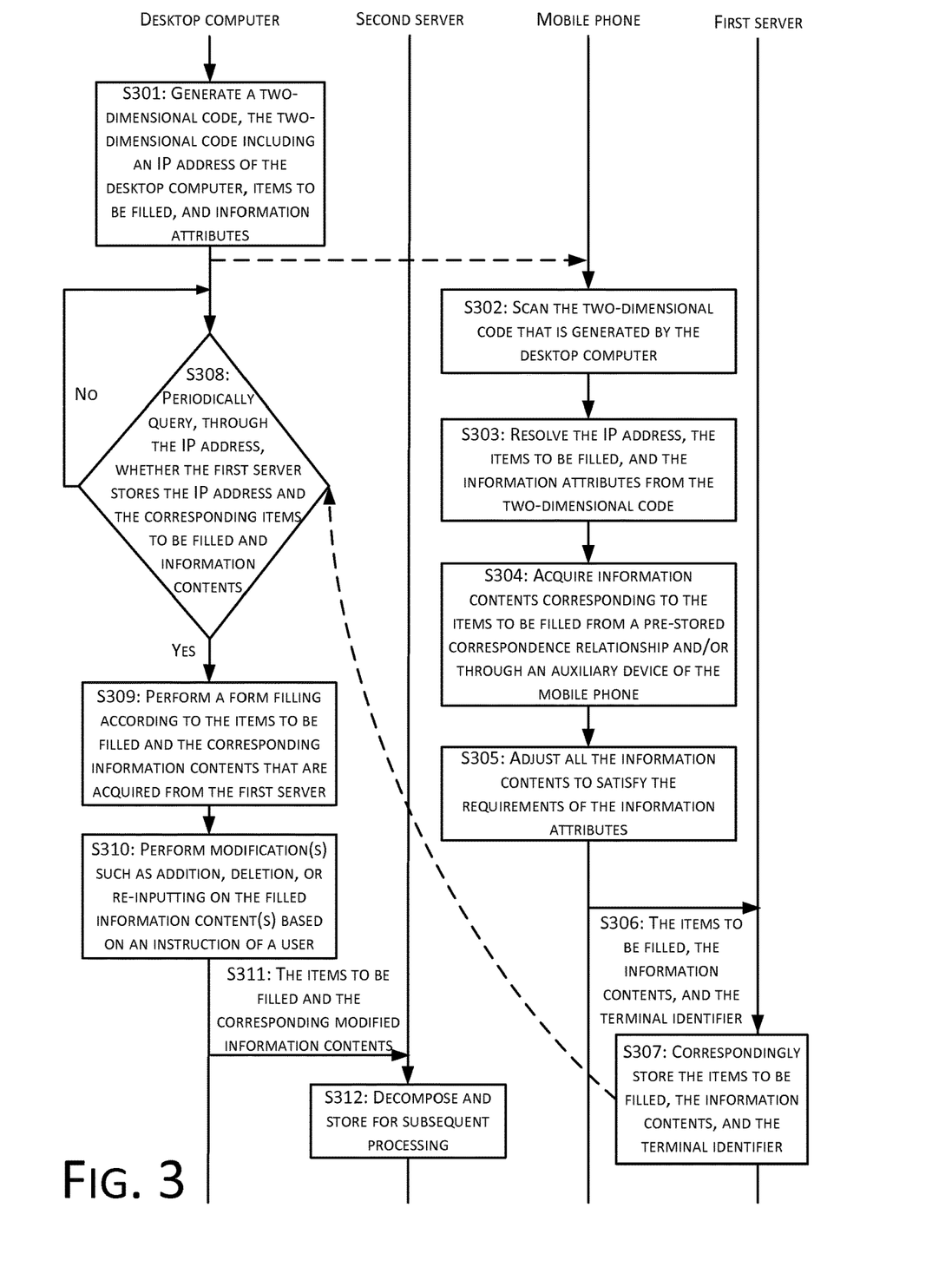
FIG. 3 is a flowchart of still another example method according to the embodiments of the present disclosure.

Referring to FIG. 3, the embodiments of the present disclosure provide another embodiment of a form filling method. In this embodiment, description is provided with the first terminal being a mobile phone, the second terminal being a desktop computer, and the digital object identifier being a two-dimensional code as an example for illustration.

The embodiment may include:

At S301, the desktop computer generates a two-dimensional code through a QR encoding rule when a user needs to register for membership. The two-dimensional code includes an operational source identifier of the desktop computer, items to be filled for user membership registration, and information attributes of the items to be filled.

If the operational source identifier is an IP address of the desktop computer, and the items to be filled include a name, a birth date, and location information, the generated two-dimensional code may include the following information:

{<name, type=character string & length <=8 characters>, <birth date, type=date>, <address information, type=address> . . . }+IP address: 127.127.168.230

At S302, the user scans the two-dimensional code generated by the desktop computer using the mobile phone. The two-dimensional code may be printed by the desktop computer and placed nearby.

At S303, the mobile phone parses the operational source identifier of the desktop computer, the items to be filled, and the information attributes of the items to be filled from the two-dimensional code through a QR decoding rule.

At S304, the mobile phone acquires information contents corresponding to the items to be filled from a pre-stored correspondence relationship between the information items and the information contents and/or through an auxiliary device of the mobile phone.

A specific approach of obtaining an information content corresponding to each information item may be determined according to a preset acquisition method. The items to be filled being the name, the birth date and the location information are still used as an example. If the mobile phone stores the correspondence relationship as shown in Table 2, the information contents, Zhang San and 1982-09-04, are obtained based on the correspondence relationship, and the address information of the user is acquired via a GPS device.

At S305, the mobile phone resolves the information attributes corresponding to the items to be filled as Boolean expressions respectively, and puts respective information contents in the Boolean expressions for computation. If a computation result of an expression is a NO, an automatic format adjustment is performed or the user is prompted to make a manual modification, till computation results of all the expressions are YES. In this case, this indicates that all information contents satisfy requirements of respective information attributes.

At S306, the mobile phone submits the items to be filled, the information contents corresponding to the items to be filled, and the operational source identifier of the desktop computer to a first server through an interface invocation request, with an address of the first server being preconfigured in the mobile phone.

At S307, the first server correspondingly stores the items to be filled, the information contents corresponding to the items to be filled, and the operational source identifier of the desktop computer in the first server upon receiving the interface invocation request.

At S308, the desktop computer enters into a wait-for-input state and periodically invokes a query interface of the first server to query whether the first server stores the operational source identifier and the corresponding items to be filled as well as the information contents using the operational source identifier of the desktop computer after generating the two-dimensional code, keeps waiting for a next periodic invocation of the interface if not, and obtains information stored in the first server if affirmative. At that time, the first server may delete the information stored therein.

At S309, the desktop computer completes the form based on the items to be filled and the corresponding information contents that are obtained from the first server.

At S310, the desktop computer performs a modification operation such as addition, deletion, or re-inputting for the filled information content(s) according to an instruction of the user if the user finds that the filled information content(s) is/are erroneous or missing.

At S311, the desktop computer submits the items to be filled and the corresponding modified information contents to the second server, to allow the second server to perform decomposition and storage thereof, and perform a subsequent registration processing according to a service requirement at S312.

Figure 4:
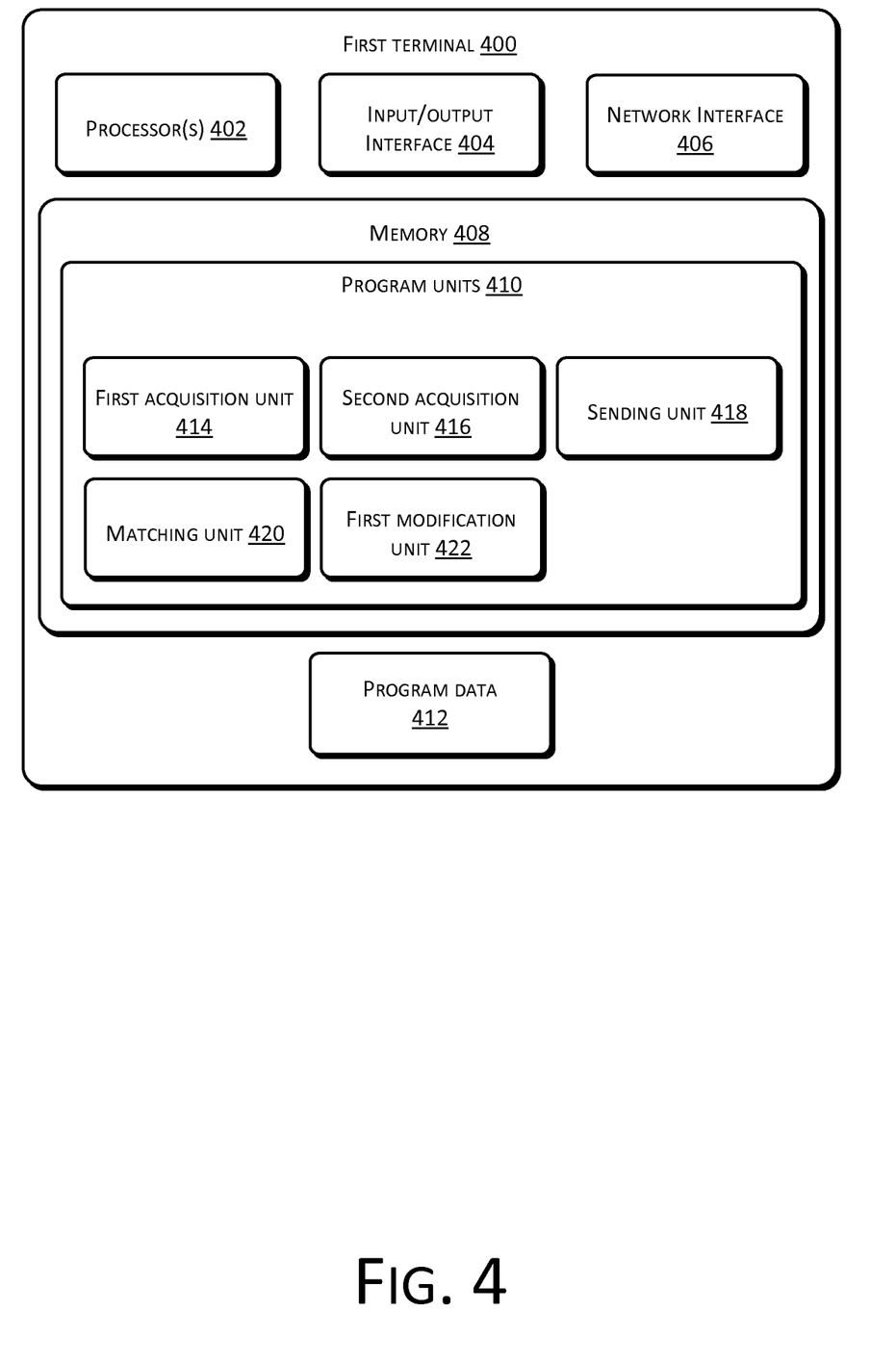
FIG. 4 is a schematic structural diagram of an example terminal according to an embodiment of the present disclosure.

As shown in FIG. 4, the present disclosure further provides an exemplary embodiment of a form filling terminal that corresponds to the method embodiment shown in FIG. 1. The form filling terminal in this embodiment is a first terminal 400. The first terminal 400 in this embodiment may include one or more processors 402, an input/output interface 404, a network interface 406 and memory 408.

The memory 408 may include a form of computer readable media such as volatile memory, Random Access Memory (RAM), and/or non-volatile memory, e.g., Read-Only Memory (ROM) or flash RAM, etc. The memory 408 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 408 may include program units 410 and program data 412. The program units 410 may include a first acquisition unit 414, a second acquisition unit 416 and a sending unit 418.

The first acquisition unit 414 is configured to obtain an operational source identifier of a form to be filled and item(s) to be filled by a user on a second terminal from a scanned digital object identifier, the scanned digital object identifier being a digital object identifier generated by the second terminal.

When a user needs to fill in a form in a second terminal, the second terminal generates a digital object identifier to be scanned by a first terminal 400. The first terminal 400 corresponds to a single user only, thus having a high degree of privacy. For example, the first terminal may be a mobile terminal such as a mobile phone or an IPAD, or may be a personal computer of the user. No limitation is imposed on the second terminal, which may generally be a public terminal.

When scanning the digital object identifier, the first terminal 400 may directly scan the digital object identifier displayed on a screen of the second terminal. In a scenario that the first terminal 400 cannot be moved easily, the digital object identifier may also be printed by the second terminal, with the printed digital object identifier being scanned by the first terminal 400.

The operational source identifier of the form to be filled by the user in the second terminal may identify the form that needs to be filled at this time, and the form to be filled refers to a form to which the item(s) to be filled belong(s). The operational source identifier may be generated based on the form, which in this case may allow multiple users to fill multiple forms at the same time. The operational source identifier may alternatively be a fixed identifier, which in this case may satisfy a requirement of a particular scenario (for example, after the digital object identifier is printed, the operational source identifier in the digital object identifier generally needs to be in a status of being available all the time).

The item(s) to be filled refer(s) to information item(s) that the user needs to fill in the form to be filled of the second terminal to acquire a certain service. For example, when the user wants to perform user registration through the second terminal, the user needs to fill information items such as a username, a birth date, an age, an address, a mobile phone number, and a headshot, etc., into a form of the second terminal.

The first acquisition unit 414 may obtain information included in the digital object identifier by decoding the digital object identifier. A decoding method of the first terminal 400 corresponds to an encoding method of the second terminal for generating the digital object identifier. For example, if the second terminal generates the digital object identifier according to a quick response (QR) encoding rule, the first terminal 400 may perform decoding according to a QR decoding rule.

The second acquisition unit 416 is configured to obtain information content(s) corresponding to the item(s) to be filled from a pre-stored correspondence relationship between the information item(s) and the information content(s) and/or through an auxiliary device of the first terminal 400.

In an embodiment of the present disclosure, the second acquisition unit 416 has at least two modes of obtaining the information content(s) corresponding to the item(s) to be filled.

In a first acquisition approach, the first terminal 400 pre-stores a correspondence relationship (as shown in Table 1, for example) between information item(s) and information content(s), and the first acquisition unit 416 acquires the information content(s) corresponding to the item(s) to be filled from the stored correspondence relationship.

In a second acquisition approach, the second acquisition unit 416 obtains the information content(s) corresponding to the item(s) to be filled via an auxiliary device of the first terminal 400 in real time. The auxiliary device may include at least one of a GPS device, a SIM card, a recorder, a gyroscope or a camera.

After obtaining the item(s) to be filled from the digital object identifier, whether the first acquisition approach or the second acquisition approach is used for a respective information content corresponding to each item to be filled may be determined according to a preset acquisition mode. Furthermore, a corresponding validity period, such as the one shown in Table 2, may be set for the respective information content corresponding to each information item. It should be noted that some information contents corresponding to some information items may also be computed and obtained based on respective information content(s) corresponding to other information item(s). For example, information content corresponding to an information item "Age" may be computed and obtained based on information content corresponding to an information item "Birth date".

The sending unit 418 is configured to send the information content(s) corresponding to the item(s) to be filled and the operational source identifier to a first server correspondingly, to allow the second terminal to obtain the information content(s) corresponding to the item(s) to be filled from the first server based on the operational source identifier to perform form filling.

After the first terminal 400 sends the corresponding information content(s) and the operational source identifier to the first server, the first server may store thereof temporarily. After generating the digital object identifier, the second terminal may cyclically attempt to acquire whether the first server stores the foregoing information, till the foregoing information stored in the first server is acquired. After the second terminal acquires the information, the first server may delete the information to avoid an information leakage.

In an embodiment of the present disclosure, the second terminal finally acquires the information content(s) corresponding to the item(s) to be filled to fill in the form, and may send to a second server to perform subsequent operations. It is noted herein that the subsequent operations mentioned in the embodiment of the present disclosure mainly include an authentication operation such as identity authentication, login, registration, etc., and a service acquisition operation (for example, acquiring a life service based on address information).

When filling information into a form, each information item generally has a certain restriction, for example, format restrictions such as a character type, a length, etc., or whether the item is mandatory, the second terminal may further enable the generated digital object identifier to include respective information attribute(s) of the item(s) to be filled. An information attribute indicates a restriction on a respective information item. In an embodiment, the acquisition unit 414 may be further configured to obtain respective information attribute(s) of the item(s) to be filled from the digital object identifier. In an embodiment, the first terminal 400 may further include a matching unit 420. The matching unit 420 is configured to determine whether the information content(s) corresponding to the item(s) to be filled match(es) with the respective information attribute(s) of the item(s) to be filled, perform an automatic format adjustment or prompting the user to make an manual modification if not, and notify the sending unit 418 to send the information content(s) corresponding to the item(s) to be filled and the operational source identifier to the first server until the information content(s) match(es) with the respective information attribute(s). When determining whether the information content(s) match(es) with the respective information attribute(s), the respective information attribute(s) may be resolved as Boolean expression(s), and the information content(s) is put in the Boolean expression for computation. If a computation result is negative, this indicates a mismatch.

In an embodiment of the present disclosure, before the sending unit 418 sends the information content(s) to the first server, the information content(s) may be displayed in the first terminal 400 in advance. The first terminal 400 may further include a first modification unit 422. The users may check whether the information content(s) to be sent is/are erroneous or missing. If so, the first modification unit 422 may further modify the information content(s) corresponding to the item(s) to be filled in accordance with an instruction of the user, with the sending unit 418 sending the modified content to the first server.

The first server in this embodiment may not be used for performing subsequent operations related to authentication and service acquisition, and may be a dedicated server set up for form filling. The sending unit 418 may send the corresponding item(s) to be filled when sending the information content(s) to the first server, to allow the second terminal to fill the information content(s) corresponding to the item(s) to be filled into the form correctly. Alternatively, the sending unit 418 may send the information content(s) to the first server according to a filling rule that has been agreed upon with the second terminal in advance. For example, the first terminal 400 and the second terminal may agree in advance that corresponding information contents are sent in an order of items to be filled.

Figure 5:
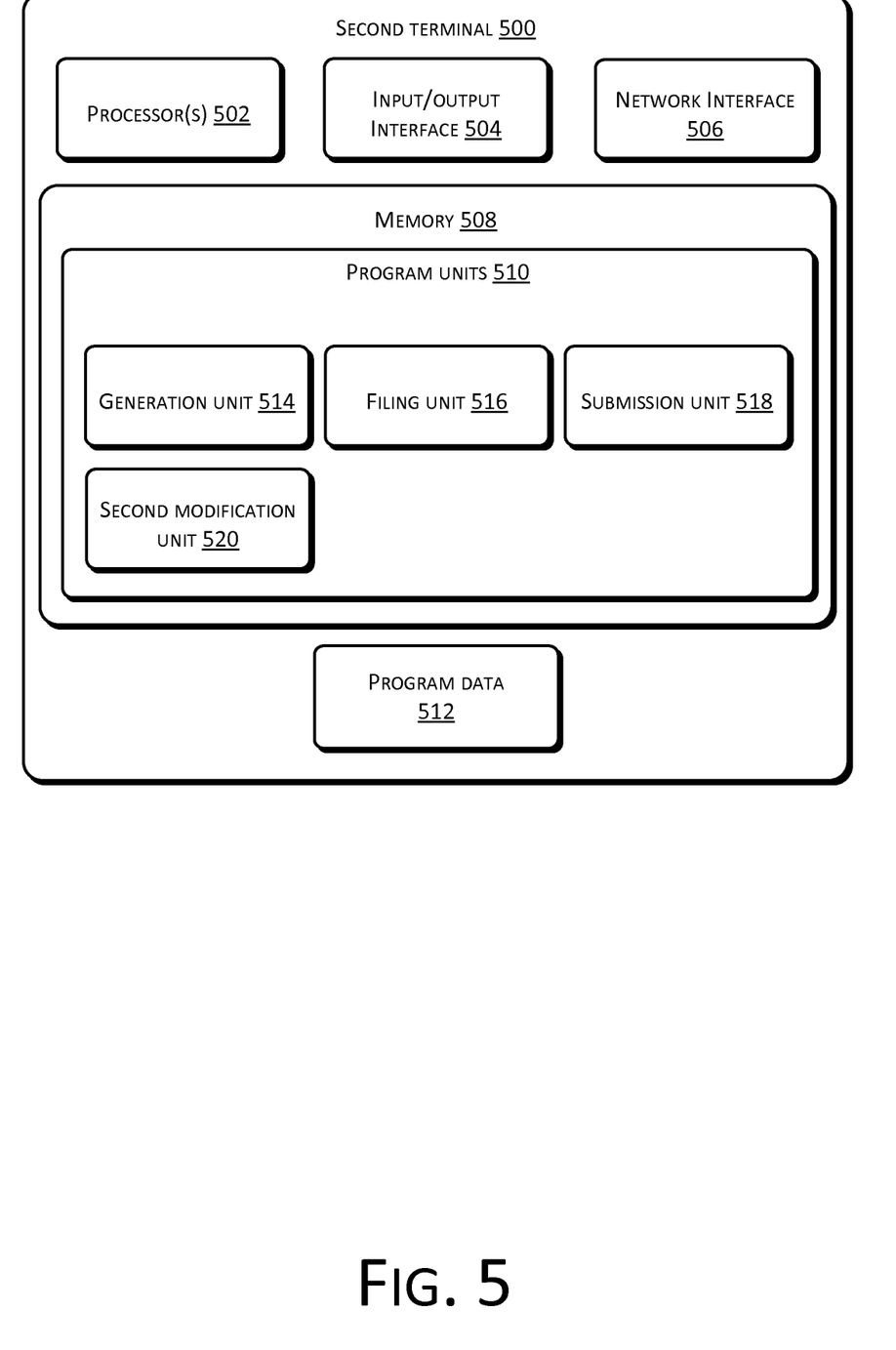
FIG. 5 is a schematic structural diagram of an example terminal according to another embodiment of the present disclosure.

As shown in FIG. 5, the present disclosure further provides an example embodiment of a form filling terminal corresponding to the method embodiment shown in FIG. 2. The form filling terminal in this embodiment is a second terminal 500. In an embodiment, the second terminal 500 may include one or more processors 502, an input/output interface 504, a network interface 506 and memory 508. The memory 508 may include a form of computer readable media such as volatile memory, Random Access Memory (RAM), and/or non-volatile memory, e.g., Read-Only Memory (ROM) or flash RAM, etc. The memory 508 is an example of a computer readable media as described in the foregoing description.

In an embodiment, the memory 508 may include program units 510 and program data 512. The program units 510 may include may include a generation unit 514 and a filling unit 516.

The generation unit 514 is configured to generate a digital object identifier, the digital object identifier including an operational source identifier of a form to be filled and item(s) to be filled by a user on the second terminal, to enable a first terminal to scan the digital object identifier, obtain information content(s) corresponding to the item(s) to be filled from a pre-stored correspondence relationship between the information item(s) and the information content(s) and/or through an auxiliary device of the first terminal, and send the information content(s) corresponding to the item(s) to be filled and the operational source identifier to a first server correspondingly.

When a user needs to fill in a form on the second terminal 500, the second terminal 500 generates a digital object identifier that is to be scanned by the first terminal. The digital object identifier may be displayed in a display screen of the second terminal 500 and scanned by the first terminal. Alternatively, the digital object identifier may be printed out by the second terminal 500 and the printed digital object identifier is scanned by the first terminal.

The operational source identifier of the form to be filled by the user on the second terminal 500 may identify a form to be filled at this time. The form to be filled refers to a form to which the item(s) to be filled belong(s). The operational source identifier may be generated based on the form, which in this case can enable multiple users to fill multiple forms at the same time. The operational source identifier may alternatively be a fixed identifier, which in this case can satisfy a requirement of a particular scenario (for example, after the digital object identifier is printed, the operational source identifier in the digital object identifier generally needs to be available all the time).

An item to be filled refers to an information item that a user needs to fill in a form to be filled of the second terminal 500 to acquire certain services. For example, when a user wants to perform user registration through the second terminal 500, the user needs to fill information items such as a username, a birth date, an age, an address, a mobile phone number, a headshot, etc., into a form of the second terminal 500.

The filling unit 516 is configured to obtain the information content(s) corresponding to the item(s) to be filled from the first server based on the operational source identifier to perform form filling. The first server may be a dedicated server configured to fill in form information.

Obtaining the information content(s) corresponding to the item(s) by the filling unit 516 from the first server based on the operational source identifier refers to cyclically performing an attempt of obtaining the information content(s) corresponding to the item(s) to be filled by the filling unit 516 from the first server based on the operational source identifier until the information content(s) corresponding to the item(s) to be filled is/are acquired.

In an embodiment of the present disclosure, the filling unit 516 may finally obtain the information content(s) corresponding to the item(s) to be filled to fill in the form. The second terminal 500 may further include a submission unit 518. The submission unit 518 is configured to submit the information content(s) corresponding to the item(s) to be filled to a second server after the filling unit 516 has filled in the form, so that the second server performs subsequent operations such as an authentication operation or service acquisition.

Before the submission unit 518 submits the information content(s) corresponding to the item(s) to be filled to the second server, the information content(s) may also be displayed on the second terminal. The user checks whether the filled information content(s) is/are erroneous or missing. If so, a second modification unit 520 may modify the information content(s) corresponding to the item(s) to be filled in accordance with an instruction of the user, and submit the modified information content(s) to the second server. In this case, the second terminal 500 further includes the second modification unit 520.

This embodiment corresponds to the terminal embodiment shown in FIG. 4, and is therefore described in a relatively simple manner. Reference may be made to relevant portions of the embodiment shown in FIG. 4.

One skilled in the art can clearly understand that detailed working processes of the foregoing systems, apparatuses and units may be referenced to corresponding processes in the foregoing method embodiments, and are not repeatedly described herein for the sake of convenience and ease of description.

In the embodiments provided by the present disclosure, it should be understood that the disclosed system, apparatus, and method may be implemented in other manners. For example, the described apparatus embodiment is merely exemplary. For example, the division of units is merely a division of logical functions and other ways of division may exist in real implementations. For example, a plurality of units or components may be combined or integrated into another system, or some features may be ignored or not executed. In addition, the displayed or discussed mutual couplings, direct couplings or communication connections may be implemented through indirect couplings or communication connections between some interfaces, apparatuses or units, and may be implemented in electronic, mechanical, or other forms.

The units that are described as separate components may or may not be physically separate. Components displayed as units may or may not be physical units, and may be located in a single position, or may be distributed among a plurality of network units. Some or all of the units may be selected according to actual needs to achieve the objectives of the solutions of the embodiments.

In addition, functional units in the embodiments of the present disclosure may be integrated as a single processing unit. Alternatively, each of the units may exist as physically independent. Alternatively, two or more units may be integrated as a single unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage media. Based on this understanding, the nature of the technical solutions of the present disclosure, the part contributing to existing technologies, or all or some of the technical solutions may be implemented in the form of a software product. The software product is stored in a storage media, and includes instructions to cause a computing device (which may be a personal computer, a server, or a network device, etc.) to perform all or some of the method blocks of the methods described in the embodiments of the present disclosure. The storage media may include various types of media that are able to store program codes, such as a USB flash drive, a removable hard disk, a read-only memory (ROM), a random access memory (RAM), a magnetic disk, or an optical disk, etc.

Based on the above description, the embodiments are merely used for describing the technical solutions of the present disclosure and do not impose any limitation thereon. Although a detailed description of the present disclosure is given with reference to the foregoing embodiments, one skilled in the art should understand that modifications may still be made to the technical solutions described in the foregoing embodiments, or equivalent replacements may be performed for some of the technical features thereof. These modifications and replacements do not cause the nature of the corresponding technical solutions to depart from the spirit and scope of the technical solutions of the embodiments of the present disclosure.

What is claimed is:

1. A method comprising:
   scanning, by a first terminal, a digital object identifier generated by a second terminal, the digital object identifier comprising an operational source identifier of a form to be filled on a page displayed on the second terminal and one or more information items to be entered into the second terminal, the operational source identifier of the form to be filled being generated based on a session identifier of the page that allows multiple users to fill multiple forms at the same time;
   obtaining, by the first terminal, the operational source identifier and the one or more information items to be entered from the digital object identifier;
   obtaining, by the first terminal, one or more information contents corresponding to the one or more information items to be entered; and
   sending, by the first terminal, the one or more information contents and the operational source identifier including the terminal identifier of the second terminal to a first server, the first server making a query interface available for the second terminal to automatically and periodically check the operational source identifier and the one or more information contents until the one or more information contents corresponding to the one or more information items to be entered are obtained by the second terminal and deleting the one or more information contents from the first server after the one or more information contents are obtained by the second terminal.

2. The method of claim 1, wherein the first server comprises a dedicated server set up for entering form information.

3. The method of claim 1, wherein the digital object identifier further includes respective one or more information attributes of the one or more information items to be entered, and the method further comprises:
obtaining, by the first terminal, the respective one or more information attributes from the digital object identifier; and
determining whether the one or more information contents corresponding to the one or more information items to be entering match with the respective one or more information attributes.

4. The method of claim 3, further comprising performing, by the first terminal, an automatic format adjustment or prompting a user to perform a manual modification in response to determining that at least one of the one or more information contents corresponding to the one or more information items to be entered does not match with a corresponding one of the respective one or more information attributes.

5. The method of claim 3, further comprising sending, by the first terminal, the one or more information contents corresponding to the one or more information items to be entered and the operational source identifier to the first server in response to determining that each of the one or more information contents corresponding to the one or more information items to be entered matches with a corresponding one of the respective one or more information attributes.

6. The method of claim 1, further comprising modifying, by the first terminal, at least one of the one or more information contents corresponding to the one or more information items to be entered based at least in part on an instruction of a user prior to sending the one or more information contents corresponding to the one or more information items to be entered to the first server.

7. The method of claim 1, further comprising obtaining, by the first terminal, the one or more information contents via an auxiliary device of the first terminal.

8. The method of claim 7, wherein the auxiliary device comprises at least one of a global positioning system (GPS) device, a subscriber identity module (SIM) card, a recorder, a gyroscope or a camera.

9. The method of claim 1, wherein the operational source identifier is used for identifying the form to be filled, and the form to be filled comprises a form to which the one or more information items belong.

10. One or more computer-readable media storing executable instructions that, when executed by a first terminal, cause the first terminal to perform acts comprising:
scanning a digital object identifier generated by a second terminal, the digital object identifier comprising an operational source identifier of a form to be filled on a page displayed on the second terminal and one or more information items to be entered into the second terminal, the operational source identifier of the form to be filled being generated based on a session identifier of the page among multiple pages opened at the same time at the second terminal, a respective page corresponding to a respective form to be filled;
obtaining the operational source identifier and the one or more information items to be entered from the digital object identifier;
obtaining one or more information contents corresponding to the one or more information items to be entered; and
sending the one or more information contents and the operational source identifier including the terminal identifier of the second terminal to a first server.

11. The one or more computer-readable media of claim 10, wherein the digital object identifier further comprises respective one or more information attributes of the one or more information items to be entered, and the acts further comprise:
obtaining the respective one or more information attributes from the digital object identifier; and
determining whether the one or more information contents corresponding to the one or more information items to be entered match with the respective one or more information attributes.

12. The one or more computer-readable media of claim 11, the acts further comprising performing an automatic format adjustment or prompting a user to perform a manual modification in response to determining that at least one of the one or more information contents corresponding to the one or more information items to be entered does not match with a corresponding one of the respective one or more information attributes.

13. The one or more computer-readable media of claim 12, wherein the sending, by the first terminal, the one or more information contents and the operational source identifier including the terminal identifier of the second terminal to the first server includes sending the one or more information contents corresponding to the one or more information items to be entered and the operational source identifier to the first server in response to determining that each of the one or more information contents corresponding to the one or more information items to be entered matches with a corresponding one of the respective one or more information attributes.

14. The one or more computer-readable media of claim 10, the acts further comprising modifying at least one of the one or more information contents corresponding to the one or more information items to be entered based at least in part on an instruction of a user prior to sending the one or more information contents corresponding to the one or more information items to be entered to the first server.

15. The one or more computer-readable media of claim 10, the acts further comprising obtaining one or more information contents corresponding to the one or more information items to be entered via an auxiliary device of the first terminal, wherein the auxiliary device comprises at least one of a global positioning system (GPS) device, a subscriber identity module (SIM) card, a recorder, a gyroscope or a camera.

16. A system comprising:
one or more processors; and
one or more computer-readable media storing executable instructions that, when executed by the one or more processors, cause the one or more processors to perform acts comprising:
obtaining a digital object identifier, the digital object identifier comprising an operational source identifier of a form to be filled and one or more information items to be entered in the system, the operational source identifier including an IP address of a terminal that generates the form;
determining one or more preset acquisition modes of one or more information contents corresponding to the one or more information items to be entered, a first acquisition mode for a first information content corresponding to a first information item to be entered being different from a second acquisition mode for a second information content corresponding to a second information item to be entered;

obtaining the one or more information contents corresponding to the one or more information items to be entered according to the one or more acquisition modes; and sending the one or more information contents corresponding to the one or more information items to be entered and the operational source identifier to a first server, the first server making a query interface available for the terminal to automatically and periodically check the operational source identifier and the one or more information contents until the one or more information contents corresponding to the one or more information items to be entered are obtained by the second terminal.

17. The system of claim 16, wherein the acts further comprise submitting the one or more information contents corresponding to the one or more information items to be entered to a second server to perform subsequent operations.

18. The system of claim 17, wherein the acts further comprise modifying at least one of the one or more information contents corresponding to the one or more information items to be entered according to an instruction of a user, before the submitting the one or more information contents corresponding to the one or more information items to be entered to the second server.

19. The system of claim 16, wherein the operational source identifier is used for identifying the form to be filled, and the form to be filled comprises a form to which the one or more information items to be entered belong.

20. The system of claim 16, wherein the acts further comprise deleting the one or more information contents from the first server in response to a result that the terminal retrieves the one or more information contents from the first server based on the operational source identifier and the one or more information items to be entered.

* * * * *